No. 812,289. PATENTED FEB. 13, 1906.
O. O. OZIAS.
PRICE SCALE.
APPLICATION FILED OCT. 24, 1905.
2 SHEETS—SHEET 1.
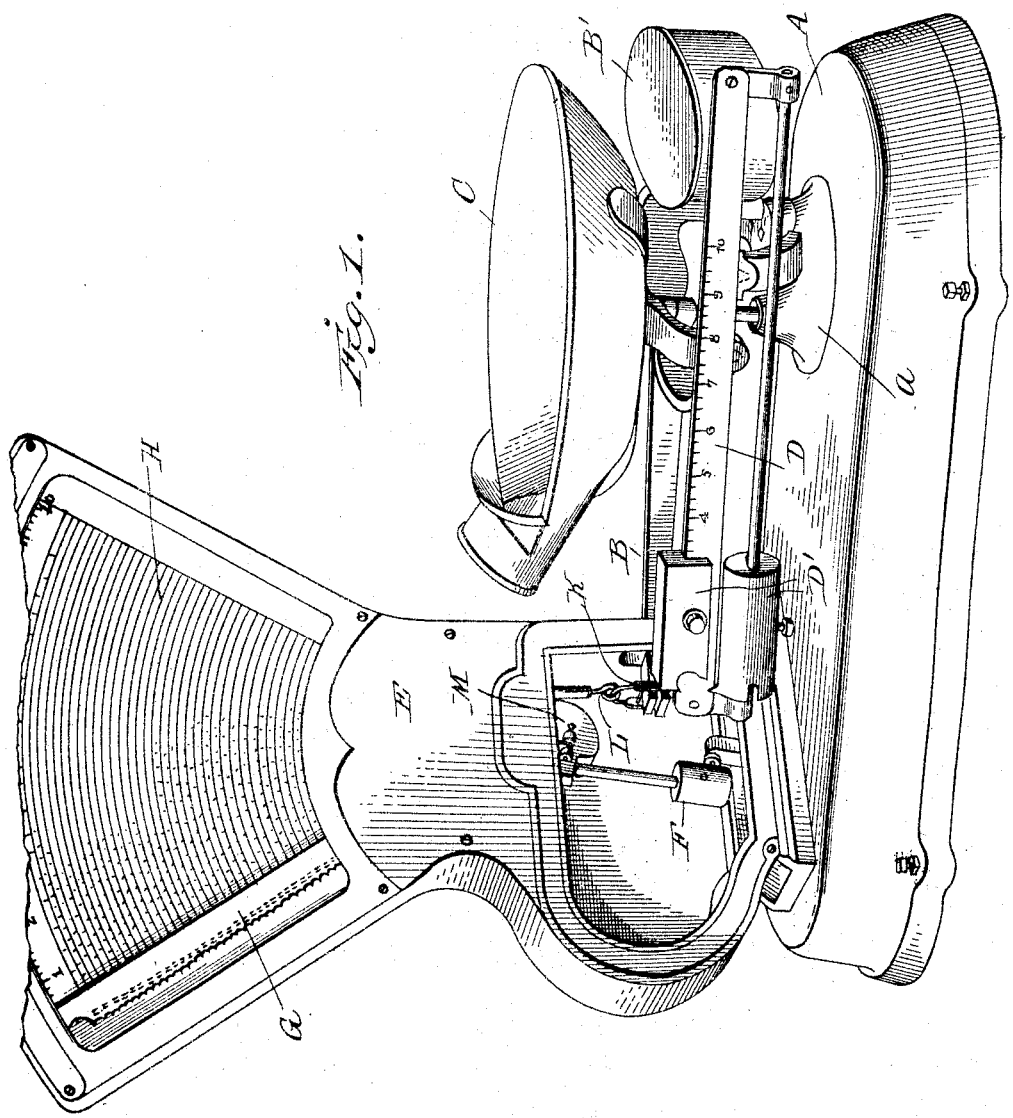

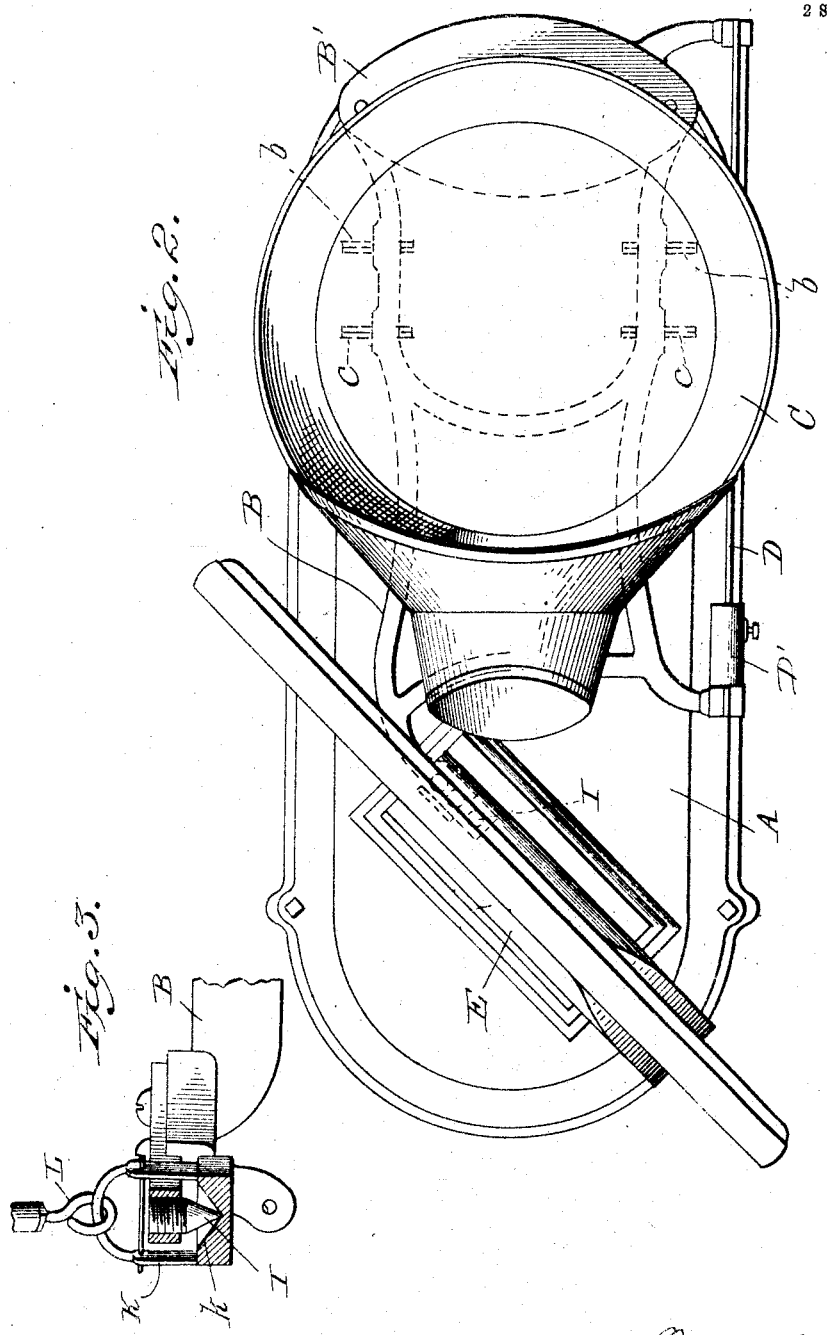

UNITED STATES PATENT OFFICE.

ORANGE O. OZIAS, OF DAYTON, OHIO, ASSIGNOR TO THE COMPUTING SCALE COMPANY, OF DAYTON, OHIO, A CORPORATION OF OHIO.

PRICE-SCALE.

No. 812,289.                Specification of Letters Patent.               Patented Feb. 13, 1906.

Application filed October 24, 1905. Serial No. 284,256.

*To all whom it may concern:*

Be it known that I, ORANGE O. OZIAS, a citizen of the United States, residing at Dayton, in the county of Montgomery and State of Ohio, have invented certain new and useful Improvements in Price-Scales; and I do hereby declare the following to be a full, clear, and exact description of the same, reference being had to the accompanying drawings, forming a part of this specification, and to the letters of reference marked thereon.

This invention relates, primarily, to improvements in price-scales of that type wherein a chart or table of value computations is provided and with which a pointer or indicator moved in accordance with and by the weight of the goods being weighed coöperates in indicating the value of such goods.

The object of the invention is to provide a scale having a small factor of error and with the parts so arranged or disposed with relation to each other that the goods may be placed on the scale and the value read with certainty in the most convenient manner and without change of position of the salesman.

The invention consists in certain novel details of construction and combinations and arrangements of parts, all as will be hereinafter described, and pointed out particularly in the appended claims.

Referring to the accompanying drawings, Figure 1 is a front elevation of a scale embodying the present improvements. Fig. 2 is a top plan view of the same. Fig. 3 is a detail view of the end of the beam or lever and the connections between the same and the indicator and pendulum-weight counterbalance of the scale.

Similar letters of reference in the several figures indicate like parts.

The base of the scale (lettered A) is, as usual, preferably cast metal, adapted to rest on a counter or other flat support. Near one end it is provided with a stand A for supporting the bearings of the knife-edge pivots b of the beam or lever B. At a point forward of the pivots b the beam or lever is provided with a second set of pivots c, on which the pan, platform, or goods-receiver C is mounted, said pan or platform being held against tilting by the usual check-wire or link located in the base.

In the preferred construction the beam or lever and platform are balanced by weight in a receptacle B', formed integral with the outer end of the lever, while at the front the beam is provided with a graduated bar or bars D for the usual sliding weights D', used for weighing off tare or increasing the weighing capacity of the scale.

At the end of the base away from the stand A is a vertically-arranged housing or frame E for the value-chart and indicating mechanism. This housing is secured permanently to the base in a diagonal position—that is to say, so that the chart faces directly toward the position occupied by a person standing beside the scale in position to place goods on or remove the same from the platform.

The mechanism for counterbalancing the weight of the goods within the normal capacity of the chart is a pendulum-weight F, hung on pivots in the housing E and adapted to swing in the plane of said housing, inasmuch as an upwardly-extending arm G, rigid with the weighted member, constitutes the indicator for coöperation with the chart H.

The arrangement of the axis of the indicator and counterbalancing member to swing in a vertical plane diagonal to the plane in which the beam swings would under normal circumstances introduce an element of inaccuracy in the scale, and in order to overcome this the end of the beam is provided with a needle-point I, projecting downwardly, and a yoke K, having a socket-bearing k for the needle-point, serves as the connecting means between the lever and the flexible connection L, which passes partially around and is attached to the drum M on the indicator and pendulum-weight-counterbalancing member. The provision of the needle-point pivot and yoke effectually overcomes any variation because of the different planes in which the beam and weight-counterbalancing member and indicator swing.

The chart in this type of scale is segmental in form, as shown in Fig. 1, and the pointer or indicator is located in front of the same in such position that all the figures on the chart may be seen, save for the very narrow space immediately behind the indicator. As heretofore constructed the chart was arranged either parallel with the beam or at right angles thereto, and in either position the salesman had to lean over or step to one side after placing the goods on the platform in order to determine which figures the indicator registered with. Furthermore, with the chart at right angles to the beam it was found that a tall bag or receptacle on the platform obscured the dial to the great inconvenience of the salesman.

With the present diagonal arrangement of the dial, however, the difficulties mentioned are entirely overcome, for not only does the salesman have a clear view of the dial at all times, but standing in the position most natural to place goods on the platform the chart faces directly toward him, and consequently figures directly at the indicator edges are seen properly, even though the pointer or indicator is some distance away from the chart.

The diagonal arrangement has a further advantage in that the chart may be made large without extending over the platform, and the beam may be made longer without increasing the length of the scale-base.

Having thus described my invention what I claim as new, and desire to secure by Letters Patent, is—

1. In a price-scale, the combination with the base, the scale-beam pivotally supported on the base and the goods-receiver pivotally supported by the beam, of a price-chart arranged in a vertical plane diagonal to the beam, a connected indicator and pendulum-counterbalance pivoted to move in a plane parallel with the chart and diagonal to the plane in which the beam swings and a connection between the pendulum-counterbalance and beam embodying a needle-point pivot and socket-bearing therefor whereby the length of the leverage is kept uniform in the action of the scale.

2. In a price-scale, the combination with the base, the beam mounted on transverse pivots to swing in a vertical plane longitudinally of the base and a platform mounted on the beam, of a price-chart arranged in a vertical plane diagonal to the plane in which the beam swings, a combined indicator and pendulum counterbalance pivoted to swing in a plane parallel with and in front of the chart and diagonal to the plane in which the beam swings and a connection between the counterbalance and beam embodying a flexible connector, a yoke and a needle-point pivot on the beam, to prevent variation due to the different planes in which the connected parts move; substantially as described.

3. In a price-scale the combination with the scale-base, the beam pivoted thereon to swing in a vertical plane longitudinally of the base, and a platform supported by the beam, of a vertically-extending housing mounted on the base and having a segmental upper end extending in a vertical plane diagonal to the plane of movement of the beam, a price-chart in the upper part of the housing and extended in the plane of the same, a combined indicator and pendulum-weight counterbalance, pivoted in the housing to swing in a plane parallel with the chart and a flexible connection between the beam and counterbalance member embodying a yoke and a single-point pivot whereby changes in leverage due to the different arcs in which the connected members swing is prevented; substantially as described.

ORANGE O. OZIAS.

Witnesses:
H. M. WALSH,
GEO. W. KEPLER.